(12) United States Patent
Nagai

(10) Patent No.: US 8,068,875 B2
(45) Date of Patent: Nov. 29, 2011

(54) METHOD FOR ALLOCATING RADIO CHANNELS AND BASE STATION APPARATUS UTILIZING THE SAME

(75) Inventor: Makoto Nagai, Kakamigahara (JP)

(73) Assignee: KYOCERA Corporation, Kyoto (JP)

( * ) Notice: Subject to any disclaimer, the term of this patent is extended or adjusted under 35 U.S.C. 154(b) by 885 days.

(21) Appl. No.: 11/754,825

(22) Filed: May 29, 2007

(65) Prior Publication Data
US 2008/0045227 A1 Feb. 21, 2008

(30) Foreign Application Priority Data
Jun. 2, 2006 (JP) .................. 2006-154698
May 11, 2007 (JP) ................. 2007-126486

(51) Int. Cl.
*H04B 1/38* (2006.01)

(52) U.S. Cl. ......... 455/561; 370/200; 455/447; 455/450

(58) Field of Classification Search .................. 455/450, 455/447; 375/132; 370/200
See application file for complete search history.

(56) References Cited

U.S. PATENT DOCUMENTS

| | | | | |
|---|---|---|---|---|
| 5,956,649 | A * | 9/1999 | Mitra et al. | 455/522 |
| 2002/0147017 | A1* | 10/2002 | Li et al. | 455/447 |
| 2002/0163879 | A1* | 11/2002 | Li et al. | 370/200 |
| 2005/0085235 | A1* | 4/2005 | Park et al. | 455/450 |

FOREIGN PATENT DOCUMENTS
JP 2005-502218 1/2005

* cited by examiner

*Primary Examiner* — Kent Chang
*Assistant Examiner* — Dinh Nguyen
(74) *Attorney, Agent, or Firm* — Ditthavong Mori & Steiner, P.C.

(57) ABSTRACT

A base station apparatus includes a measurement unit, a derivation unit and an allocation unit. A base station apparatus allocates at least one subcarrier block, in a frequency band containing a plurality of subcarrier blocks composed of a plurality of subcarriers, to a terminal apparatus. The measurement unit measures an interference power of at least part of subcarriers among a plurality of subcarriers in each of the plurality of subcarrier blocks. The derivation unit derives, from the interference power of subcarriers measured by the measurement unit, an average value of the interference power for each of the plurality of subcarrier blocks and a statistical value indicating a degree of variation in the interference power relative to the average value. The allocation unit allocates at least one subcarrier block to the terminal apparatus, based on the average value and the statistical value derived by the derivation unit.

13 Claims, 10 Drawing Sheets

FIG.4

| LEVEL INFO 310 | COMMUNICATION PERIOD 320 | REQUIRED FREQUENCY BANDWIDTH 330 | DELAY TOLERANCE 340 | REQUIRED AVERAGE VALUE 350 | REQUIRED STATISTICAL VALUE 360 |
|---|---|---|---|---|---|
| 1 | LONG | BROAD | LOW | A | X |
| 2 | MEDIUM | MEDIUM | LOW | B | X |
| 3 | SHORT | NARROW | LOW | C | X |
| 4 | LONG | BROAD | HIGH | A | Y |
| ...... | ...... | ...... | ...... | ...... | ...... |
| L | SHORT | NARROW | HIGH | C | Y |

| APPLICATION | COMMUNICATION PERIOD | REQUIRED FREQUENCY BANDWIDTH | REAL-TIMELINESS |
|---|---|---|---|
| ELECTRONIC MAIL | 0.5 (SHORT) | 0.17 (MEDIUM) | LOW |
| TV TELEPHONE/ CONFERENCE | 1800 (LONG) | 0.50 (BROAD) | HIGH |
| VOICE CALL | 180 (MEDIUM) | 0.008 (NARROW) | HIGH |
| WEB BROWSING | 900 (LONG) | 0.004 (NARROW) | LOW |
| FILE TRANSFER | 7.0 (SHORT) | 0.50 (BROAD) | LOW |
| VIDEO ON DEMAND | 36 (MEDIUM) | 0.50 (BROAD) | LOW |
| STREAMING VIDEO | 600 (LONG) | 0.17 (MEDIUM) | HIGH |

| | SUBCARRIER BLOCK 200a | SUBCARRIER BLOCK 200b | SUBCARRIER BLOCK 200c | SUBCARRIER BLOCK 200d |
|---|---|---|---|---|
| AVERAGE VALUE | A' | C' | A' | B' |
| STATISTICAL VALUE | Y' | X' | X' | X' |

380 — AVERAGE VALUE
390 — STATISTICAL VALUE

METHOD FOR ALLOCATING RADIO CHANNELS AND BASE STATION APPARATUS UTILIZING THE SAME

CROSS-REFERENCE TO RELATED APPLICATIONS

This application is based upon and claims the benefit of priority from both the prior Japanese Patent Application No. 2006-154698, filed Jun. 2, 2006 and the prior Japanese Patent Application No. 2007-126486, filed May 11, 2007, the entire contents of which are incorporated herein by references.

BACKGROUND OF THE INVENTION

1. Field of the Invention

The present invention relates to a scheduling technology, and it particularly relates to a method for allocating channels to terminal apparatuses to be communicated and a base station apparatus utilizing said method.

2. Description of the Related Art

In wireless communication, it is generally desired that the limited frequency resources be used effectively. With the wide use of mobile phones and second-generation cordless telephone system, such a demand is ever increasing. One of technologies that meet this request is a technique called OFDMA (Orthogonal Frequency Division Multiple Access). OFDMA is a technique where communications between a base station apparatus and a plurality of terminal apparatuses are performed at the same timing by allocating transmit signals from the terminal apparatuses to mutually orthogonal frequency bands. In general, the OFDMA technique requires scheduling processing for allocating a plurality of terminal apparatuses to the respective frequency bands. In the conventional practice, a frequency band whose SN ratio is high in a plurality of frequency bands is allocated to the terminal apparatuses.

In general, there are cases where in communications of high data rates a plurality of frequencies are allocated to one terminal apparatus. In such a case, a frequency band to be allocated to a terminal apparatus is selected based on an average value of SN ratios in a plurality of frequency bands. Here, there are cases where frequency bands whose SN ratios are low are contained due to the effect of frequency selective fading and the like even if the average value of SN ratios is high. In this case, retransmission may be frequently required. On the other hand, if channel allocation to such frequency bands is prohibited, a problem will arise where resources cannot be utilized effectively.

SUMMARY OF THE INVENTION

The present invention has been made in view of the foregoing circumstances and a general purpose thereof is to provide a method for allocating radio channels to terminal apparatuses by effectively utilizing resources and a base station apparatus using said method.

In order to resolve the above problems, a base station apparatus according to one embodiment of the present invention is a base station apparatus for allocating at least one subcarrier block, in a frequency band containing a plurality of subcarrier blocks each composed of a plurality of subcarriers, to a terminal apparatus, and it comprises: a measurement unit which measures an interference power of at least part of subcarriers among a plurality of subcarriers in each of the plurality of subcarrier blocks; a derivation unit which derives, from the interference power of subcarriers measured by the measurement unit, an average value of the interference power for each of the plurality of subcarrier blocks and a statistical value indicating a degree of variation in the interference power relative to the average value; and an allocation unit which allocates at least one subcarrier block to the terminal apparatus, based on the average value and the statistical value derived by the derivation unit.

Another embodiment of the present invention relates to an allocation method. This method comprises: deriving an average value of the interference power for a subcarrier block composed of a plurality of subcarriers and a statistical value indicating a degree of variation in the interference power relative to the average value; and allocating at least one subcarrier block to a terminal apparatus, based on the derived average value and the derived statistical value.

Still another embodiment of the present invention relates to a program. This program is a program executable by a computer, and it includes the functions of: deriving an average value of the interference power for a subcarrier block composed of a plurality of subcarriers and a statistical value indicating a degree of variation in the interference power relative to the average value; and allocating at least one subcarrier block to a terminal apparatus, based on the derived average value and the derived statistical value.

Still another embodiment of the present invention relates to a base station apparatus. This base station apparatus comprises: an acquisition unit which acquires a delay tolerance, indicating a degree to which a delay in a communication is allowed, when the communication is performed with a terminal apparatus by allocating at least one subcarrier block, in a frequency band containing a plurality of subcarrier blocks each composed of a plurality of subcarriers, to the terminal apparatus; a measurement unit which measures an interference power of at least part of subcarriers among a plurality of subcarriers in each of the plurality of subcarrier blocks; a derivation unit which derives, from the interference power of subcarriers measured by the measurement unit, a statistical value indicating a degree of variation in the interference power for each of the plurality of subcarrier blocks; and an allocation unit which allocates at least one subcarrier block to the terminal apparatus, based on the statistical value derived by the derivation unit and the delay tolerance acquired by the acquisition unit.

Still another embodiment of the present invention relates to an allocation method. This method comprises: acquiring a delay tolerance, indicating a degree to which a delay in a communication is allowed, when the communication is performed with a terminal apparatus by allocating at least one subcarrier block, in a frequency band containing a plurality of subcarrier blocks each composed of a plurality of subcarriers, to the terminal apparatus; deriving, a statistical value indicating a degree of variation in interference power for a subcarrier block composed of a plurality of subcarriers; and allocating at least one subcarrier block to the terminal apparatus, based on the derived statistical value and the acquired delay tolerance.

Still another embodiment of the present invention relates to a program. This program is a program executable by a computer, and it includes the functions of: acquiring a delay tolerance, indicating a degree to which a delay in a communication is allowed, when the communication is performed with a terminal apparatus by allocating at least one subcarrier block, in a frequency band containing a plurality of subcarrier blocks each composed of a plurality of subcarriers, to the terminal apparatus; deriving, a statistical value indicating a degree of variation in interference power for a subcarrier block composed of a plurality of subcarriers; and allocating at least one subcarrier block to the terminal apparatus, based on the derived statistical value and the acquired delay tolerance.

It is to be noted that any arbitrary combination of the aforementioned constituting elements, and the implementation of the present invention in the form of a method, an apparatus, a system, a recording medium, a computer program and so forth may also be effective as and encompassed by the embodiments of the present invention.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which:

FIG. 4 shows an exemplary structure of a requested quality table stored in a memory of FIG. 3;

FIG. 6 shows a required quality example for each application in a terminal apparatus of FIG. 1;

FIG. 8 shows an example of quality of a subcarrier block according to an embodiment of the present invention;

DETAILED DESCRIPTION OF THE INVENTION

The invention will now be described by reference to the preferred embodiments. This does not intend to limit the scope of the present invention, but to exemplify the invention.

Before describing the present invention in detail, an outline of the present invention will be described first. Embodiments of the present invention relate to a communication system. This communication system is suitable for use in next-generation cordless telephone systems. A system capable of realizing communications of a high transmission rate is desired as the next-generation cordless telephone system, and an OFDMA scheme or various error correction schemes are used. In the OFDMA scheme, different frequency bands are allocated to a plurality of terminal apparatuses, respectively. In the present embodiments, a frequency band to be allocated is selected according to the communication quality requested by a terminal apparatus. The frequency band to be allocated thereto is selected according to an average value of interference powers in the frequency band or a statistical value such as a variance that indicates the degree of variation in the average value. Thereby, the resources of a system can be optimally allocated. The detail thereof will be discussed later.

Figure 1:
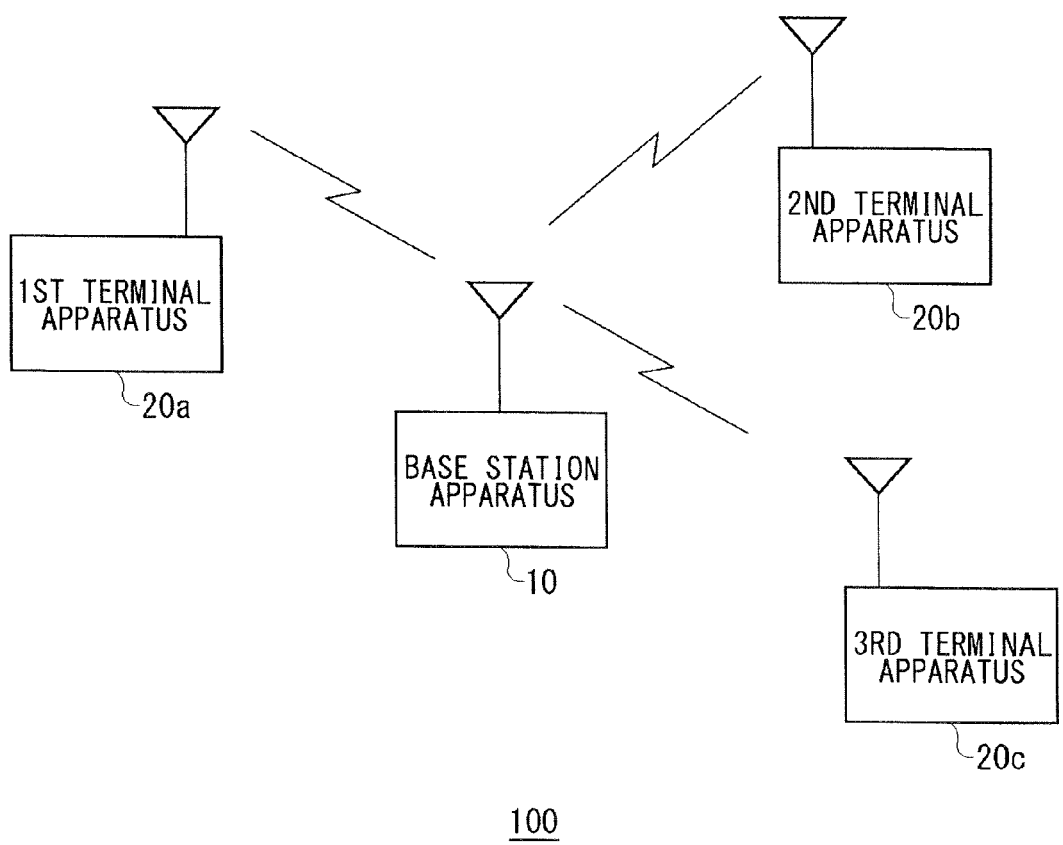
FIG. 1 shows an exemplary structure of a communication system according to an embodiment of the present invention.

FIG. 1 shows an exemplary structure of a communication system 100 according to an embodiment of the present invention. The communication system 100 includes a base station apparatus 10, and a first terminal apparatus 20a, a second terminal apparatus 20b and a third terminal apparatus 20c, which are represented by a terminal apparatus 20. Hereinbelow, a description will be given of a case where the base station apparatus 10 performs communications with the terminal apparatus 20 using OFDMA. OFDMA is used for either one of uplink and downlink, whereas TDMA (Time Division Multiple Access), SDMA (Space Division Multiple Access) or the like may be used for the other. Note that though three terminal apparatuses 20 are shown in FIG. 1 for convenience of explanation, there may be less than or equal to two or greater than or equal to four terminal apparatuses.

Figure 2:
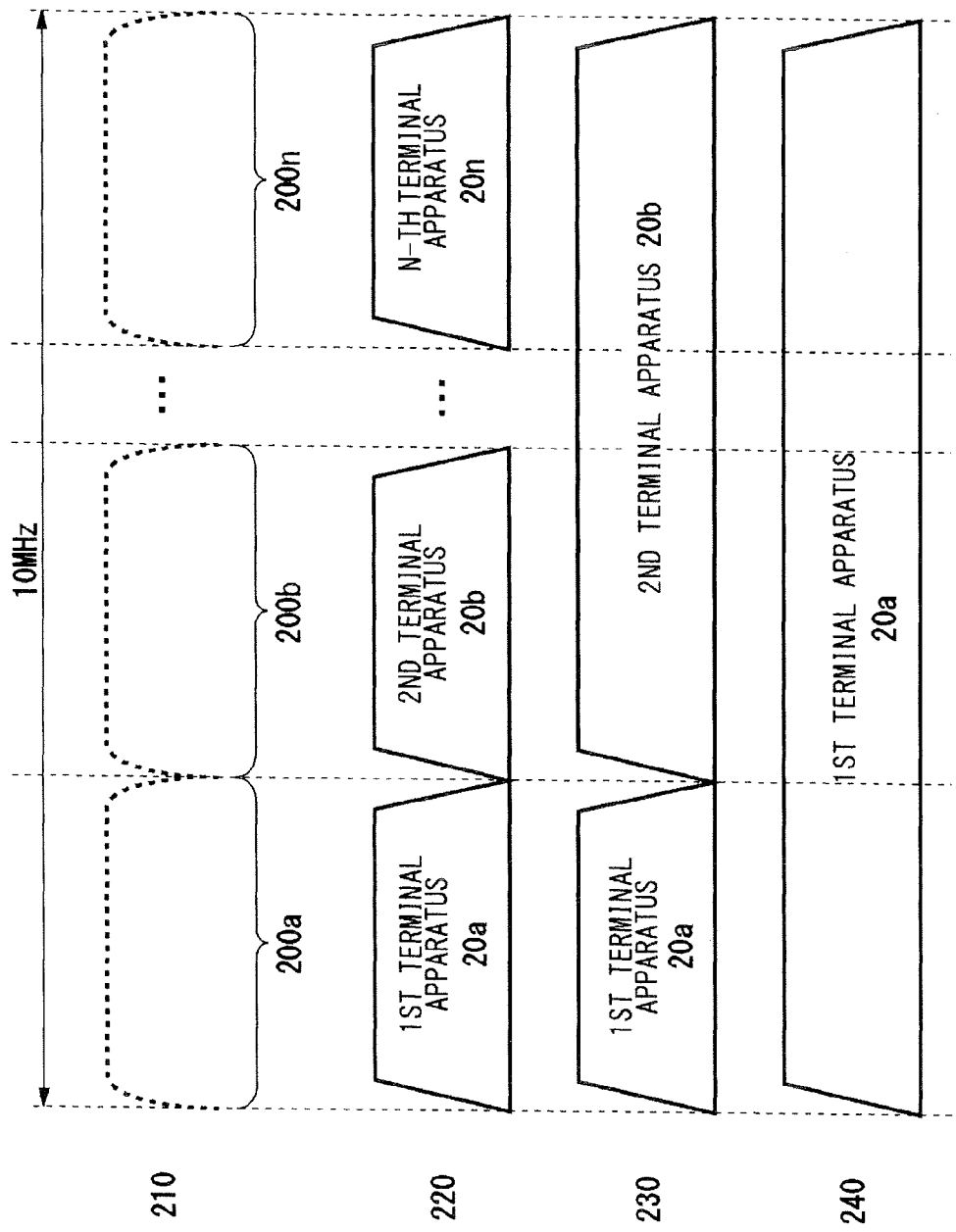
FIG. 2 shows an example of allocation of subcarrier blocks in the communication system shown in FIG. 1.

FIG. 2 shows an example of allocation of subcarrier blocks 200 in the communication system 100 shown in FIG. 1. A frequency band 210, having the bandwidth of 10 MHz, which includes a plurality of subcarrier blocks 200 is used for the communication system 100. The frequency band 210 includes N subcarrier blocks which are a first subcarrier block 200a to an nth subcarrier block 200n. Here, the first subcarrier block 200a to the nth subcarrier block 200n are represented by "subcarrier block 200". Each of subcarrier blocks 200 includes M subcarriers. Therefore the frequency band 210 contains N×M subcarriers. Hereinafter, for convenience of explanation, a description will be given assuming that N and M are each an integer of two or greater. Although, for convenience of explanation, the number of subcarriers contained in each of subcarrier blocks 200 is set to M, the subcarrier blocks 200 may each contain a different number of subcarriers.

A first channel allocation example 220 shows a case where each terminal apparatus 20 is allocated for each of the subcarrier blocks 200. That is, the maximum of N terminal apparatuses 20 can be allocated in the communication system 100. A second channel allocation example 230 shows a case where the subcarrier blocks 200 are allocated to two terminal apparatuses 20, respectively, and a different number of subcarrier blocks 200 are allocated to each terminal apparatus 20. The second channel allocation example 230 is applied to a case, for example, where both the first terminal apparatus 20a requesting a low speed communication, wherein wide band is not required, and the second terminal apparatus 20b requesting a high speed communication, wherein a wide band is required, perform communications simultaneously. By employing such an allocation scheme as above, communications can be accommodated according to the mode of a service required by the terminal apparatuses 20 and therefore the resources of a system can be optimally allocated. A third channel allocation example 240 shows a case where the entire band is allocated to a single terminal apparatus 20. In such a case where there exists a terminal apparatus 20 requesting a higher speed communication and, at the time of said communication, no request of channel allocation is made from other base station apparatuses 10, the high speed communication can be achieved by employing the allocation scheme as in the third channel allocation example 240.

As described above, a frequency band used by the terminal apparatus 20 is allocated for each of the subcarrier blocks 200, thus making it possible to provide the allocation according to a radio wave environment or required service quality between the terminal apparatus 20 and the base apparatus 10. As a result, the high speed communication is made possible and at the same time the communication system 100 capable of optimizing the utilization of system resources can be realized. For convenience of explanation, a description is given hereunder based on the allocation example shown in the first channel allocation example 220.

Refer back to FIG. 1. When starting a communication, the terminal apparatus 20 requests the base station apparatus 10 to allocate channels. The channel allocation request is executed in a manner that an allocation request signal is transmitted using a predetermined frequency band to which a predetermined subcarrier block 200 in a plurality of subcarrier blocks 200 belong. The allocation request signal contains information on a requested quality that indicates the quality of the subcarrier block 200 to be allocated. The requested quality will be discussed later. The base station apparatus 10 receives the allocation request signal from the terminal apparatus 20 and then selects a channel to be allocated to the terminal apparatus 20. The channel is selected by the following procedures (1) to (5).

(1) Upon receipt of a signal containing information on the allocation from the terminal apparatus 20, the base station apparatus 10 measures the interference intensity of all subcarrier blocks 200 that contain the frequency band of said signal. Note that not only the interference intensity but also the signal strength may be measured. Also, the ratio of the signal strength to the interference intensity may be derived. Further, the base station apparatus 10 computes an average value of interference intensities for the subcarrier blocks 200 and a statistical value such as variance. Here, if the average value of interference intensities is greater than a first threshold value for average values (hereinafter referred to as "first threshold value" or "γ"), namely if the quality is inferior, the base station apparatus 10 will not allocate any subcarrier block 200 to the terminal apparatus 20. Or if the statistical value of interference intensities is greater than a second threshold value for statistical values (hereinafter referred to as "second threshold value" or "δ"), the base station apparatus 10 will not allocate any subcarrier block 200 to the terminal apparatus 20. It is because even if a subcarrier block is allocated under this condition, the communications will not be performed normally and the frequency will be wasted in the radio communication. The first threshold value and the second threshold value are so set respectively as to indicate a boundary between whether the communication can be performed normally or not. The average values and the statistical values are also computed for subcarrier blocks 200 other than those 200 belonging to the signal received from the terminal apparatus 20. If, instead of the interference intensity, the ratio of the signal strength to the interference intensity is to be used for comparison, the relation with respect to the threshold values will be reversed as compared with the above case. That is, if the average value of the ratios of the signal strength to the interference intensity is less than the threshold value for average values, the base station apparatus 10 will not allocate any subcarrier block 200 to the terminal apparatus 20. Hereinbelow, for convenience of explanation, a description will be given of a case where the quality of the subcarrier block 200 is determined based on the interference intensity for comparison. If the ratio of the signal strength to the interference intensity is used instead of the interference intensity, it will be only necessary, as described above, that the magnitude relation for comparison is reversed. It is understood by those skilled in the art that in this latter case the same advantageous effect as when the interference intensity is used is obtained.

(2) The base station apparatus 10 determines, for each of the subcarrier blocks 200, whether or not a channel can be allocated to a terminal apparatus 20 that has transmitted an allocation request signal. This decision processing includes a first decision processing and a second decision processing. By comparing the requested quality contained in an allocation request signal with the average value and the statistical value of interference intensities computed for each of the subcarrier blocks 200, the first decision processing determines whether the average value and the statistical value of interference intensities satisfies the requested quality or not. The second decision processing checks that the subcarrier block 200 which has been determined to satisfy the requested quality in the first decision processing has not been allocated to any of the terminal apparatuses 20. The base station apparatus 10 registers the subcarrier block 200 determined to be allocatable, as an allocation candidate.

(3) The base station apparatus 10 performs allocation processing according to the number of subcarrier blocks 200 which are the allocation candidates obtained as a result of the above determination. If there is only one allocation candidate, the base station apparatus 10 will allocate the subcarrier block 200 which is the only allocation candidate, to the terminal apparatus 20. If there are a plurality of allocation candidates, the base station apparatus 10 will allocate, as a general rule, the subcarrier block 200 having the highest quality to the terminal apparatus 20. Here, the "subcarrier block 200 having the highest quality" includes a subcarrier block 200 whose average value and statistical value are the smallest among the subcarrier blocks 200 counted as the allocation candidates. If the quality requested by the terminal apparatus 20 is not high, the base station apparatus 10 will allocate, as "exception processing", a subcarrier block 20 other than the subcarrier block 200 having the highest quality, to the terminal apparatus 20. Its detail will be described later.

(4) If the number of allocation candidates is "0", the base station apparatus 10 will determine if, among the subcarrier blocks 200 allocated already to the other terminal apparatuses 20, there exists any subcarrier block 200 that satisfies the specifications requested by the terminal apparatus 20 which has transmitted the allocation request signal or not. Further, the base station apparatus 10 checks if there exists any unused subcarrier block which has not yet been allocated to any terminal apparatus 20 and the unused subcarrier block satisfies the specifications requested by the other terminal apparatuses 20 or not. If these conditions are met, the base station apparatus 10 will switch the subcarrier blocks 200 to be allocated to the other terminal apparatuses 20, to the unused subcarrier blocks. Further, the base station apparatus 10 allocates the subcarrier block 200 which has been allocated to the other terminal apparatus 200, to the terminal apparatus 20 that has transmitted the allocation request signal. If the conditions are not met, the base station apparatus 10 will not permit the allocation of the terminal apparatus 20.

(5) After the permission or rejection of allocation has been determined, the base station apparatus 10 transmits a signal indicative of permission/rejection to the terminal apparatus 10. If allocated, the base station apparatus 10 and the terminal apparatus 20 can start communicating with each other.

Figure 3:
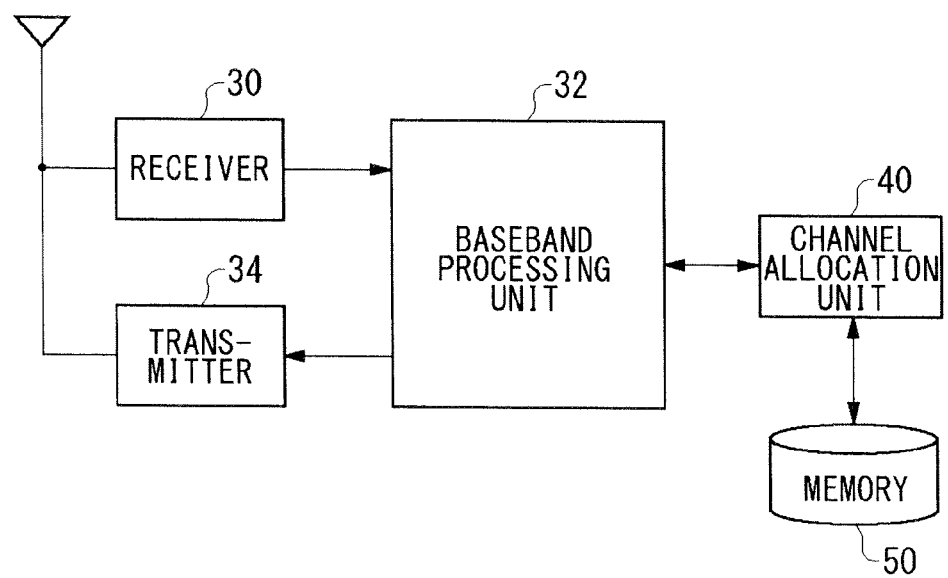
FIG. 3 illustrates an exemplary structure of a base station apparatus shown in FIG. 1.

FIG. 3 illustrates an exemplary structure of the base station apparatus 10 shown in FIG. 1. The base station apparatus 10 includes a receiver 30, a baseband processing unit 32, a transmitter 34, a channel allocation unit 40 and a memory 50. The receiver 30 receives allocation request signals from the terminal apparatuses 20. This allocation request signal may be transmitted using a predetermined subcarrier block 200. After the subcarrier block 200 has been allocated to the terminal apparatus 20, the receiver 30 receives a signal concerning data communications from the terminal apparatus 20. The receiver 30 performs FFT (Fast Fourier Transform) processing on the received signals and thereby separates a predetermined subcarrier block 200 from a plurality of subcarrier blocks 200 so as to transmit the thus separated subcarrier block 200 to the baseband processing unit 32.

The baseband processing unit 32 performs a predetermined demodulation processing on a signal to which FFT processing or the like has been subjected by the receiver 30, and also performs error correction decoding processing on the signal. The baseband processing unit 32 also performs a predetermined coding processing, such as error coding processing, on a signal that contains identification information indicative of permission/rejection of allocation or a subcarrier block 200 to be allocated. Further, the baseband processing unit 32 performs a predetermined modulation processing thereon and has the transmitter 34 send the signal. The transmitter 34 performs IFFT (Inverse FFT) processing or the like on the signal which has been subjected to the coding processing by the baseband processing unit 32, and then transmits the signal to the terminal apparatus 20.

The channel allocation unit 40 measures the interference power of at least part of subcarriers among a plurality of subcarriers for each of the subcarrier blocks 200. From the measured interference power per subcarrier, the channel allocation unit 40 derives an average value of interference powers for each subcarrier block and a statistical value indicating the degree of variation in interference power relative to the average value. Further, based on the average value and the statistical value derived by the derivation unit 44, the channel allocation unit 40 determines whether or not there is a subcarrier block 200 allocated to the terminal apparatus 20. According to this determination result, the channel allocation unit 40 has the transmitter 34 transmit a signal indicating that the allocation is permitted or not permitted.

The memory 50 stores relationship among the level of requested quality, continuous communication period for the level, required frequency bandwidth, delay tolerance, required average value and required statistical value. FIG. 4 shows an exemplary structure of a requested quality table 300 stored in the memory 50 of FIG. 3. The requested quality table 300 includes a level information column 310, a continuous communication period column 320, a required frequency bandwidth column 330, a delay tolerance column 340, a required average value column 350, and a required statistical value column 360.

The level information column 310 contains information indicating the level of requested quality, and is expressed in the decreasing order of Level 1 (highest level) to Level L (lowest level L). The continuous communication period column 320 indicates a continuous communication period including a period during which a communication is performed continuously. The period of time is indicated by "long", "medium" and "short" which are in the order starting from the longer period. "Long" and "medium" are distinguished from each other by a first period threshold value concerning the period (which is defined as a threshold value for use in period), whereas "medium" and "short" are distinguished from each other by a second period threshold value concerning the period. The required frequency bandwidth column 330 shows required frequency bandwidths. The bandwidth is indicated by "broad", "medium" and "narrow" which are in the order starting from the broader bandwidth. "Broad" is applied to a high-speed communication, whereas "narrow" is applied to low-speed communication. "Broad" and "medium" are distinguished from each other by a first bandwidth threshold value concerning the bandwidth (which is defined as a threshold value for use in bandwidth), whereas "medium" and "narrow" are distinguished from each other by a second bandwidth threshold value concerning the bandwidth. The delay tolerance column 340 shows the delay tolerance that defines the degree to which the delay in communications is permitted. The tolerance includes "low" and "high" which are distinguished from each other by threshold values concerning the tolerance (which are defined as threshold values for use in tolerance), respectively. Note that the delay tolerance may be expressed as real-timeliness. In such a case, that the delay tolerance is low is equivalent to that the real-timeliness is high. The requested quality contained in the allocation request signal that the terminal apparatus transmits may contain the level information, and may also contain the continuous communication period, the required frequency bandwidth or the delay tolerance.

The required average value column 350 and the required statistical value column 360 show an average value and a statistically value required by a subcarrier block 200 which is to be allocated to a terminal apparatus 20 performing a communication under the conditions indicated in the level information column 310, the continuous communication period column 320, the required frequency bandwidth column 330 and the delay tolerance column 340. The required average value column 350 shows an average value of interference powers required. The required average value is indicated by "A", "B" or "C" in the order starting from the smaller value. "A" and "B" are distinguished from each other by a first averaging threshold value concerning the required average value (which is defined as a threshold value for use in average values), whereas "B" and "C" are distinguished from each other by a second averaging threshold value concerning the required average value. Note that the required average value "C" contains an average value which is greater than "A" and "B" and is less than the first threshold value. The required average value "C" indicates that no higher quality is considered for the average value as long as the value is less than the first threshold value. As for the required statistical values, "X" and "Y" are indicated, respectively, in a similar manner to the required average values. Here, assume that the relation between X and Y is X<Y.

A specific description will now be given. In applications used for a television telephone, video conference or the like, the continuous communication time is relatively longer and the required frequency bandwidth is broader. Moreover, in such applications, delay is barely permissible and therefore communications need to be executed using the subcarrier block 200 of Level 1. In this case, as shown in the required average value column 350 and the required statistical value column 360, it is desired that the subcarrier block 200 to be allocated have a small average value and a small statistical value. On the other hand, in applications used for electronic mails or the like, the continuous communication time is relatively short and the delay would not be problematic. Thus, the communications are feasible if the level is basically Level 4 or lower. In this case, it is desired that the subcarrier block 200 to be allocation have a small required statistical value or a small required average value.

Figure 5:
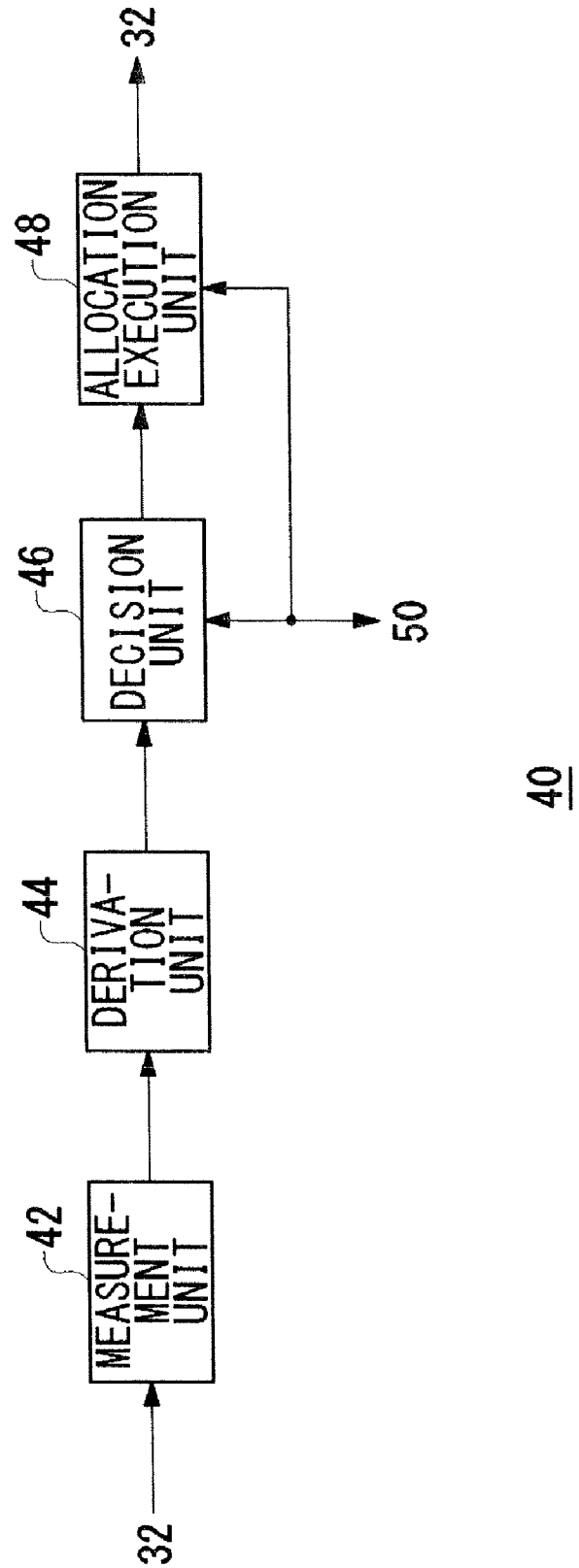
FIG. 5 shows an exemplary structure of a channel allocation unit shown in FIG. 3.

FIG. 5 shows an exemplary structure of the channel allocation unit 40 shown in FIG. 3. The channel allocation unit 40 includes a measurement unit 42, a derivation unit 44, a decision unit 46, and an allocation execution unit 48. The measurement unit 42 measures the interference power of at least part of subcarriers in a plurality of subcarriers contained in each subcarrier block. The derivation unit 44 derives, from the interference power measured by the measurement unit 42, an average value of interference powers for the respective subcarrier blocks and a statistical value indicating the degree of variation in interference power relative to the average value.

The decision unit 46 receives an average value and a statistical value derived by the derivation unit 44 for each of the subcarrier blocks. Then the decision unit 46 compares the average value with the first threshold value. Also, the decision unit 46 compares the statistical value with the second threshold value. If the average value is greater than the first threshold value or the statistical value is greater than the second threshold value, the decision unit 46 determines that no subcarrier block 20 will be allocated to the terminal apparatus 20.

If the average value is less than the first threshold value and the statistical value is less than the second threshold value, the decision unit 46 accesses the memory 50 and thereby selects a required average value and a required statistical value that satisfy the requested quality contained in the allocation request signal. Then, for each subcarrier block 200, the decision unit 46 compares an average value with the required average value and further compares a statistical value with the required statistical value. Here, among subcarrier blocks 200 where the average value is greater than the required average value and the statistical value is greater than the required statistical value, the subcarrier blocks 200 which will not be allocated to any terminal apparatus 20 is selected as allocation candidates.

If there is only one subcarrier block 200 selected as the allocation candidate, the allocation execution unit 48 will allocate the subcarrier block 200 which is the only allocation candidate, to the terminal apparatus 20. If there are two or more subcarrier blocks 200 selected as the allocation candidates, the allocation execution unit 48 will allocate, as a general rule, the subcarrier block 200 having the highest quality to the terminal apparatus 20. Even if two or more subcarrier blocks 200 are selected as the allocation candidates, the allocation execution unit 48 will perform "exception processing" in the following cases.

If the required frequency bandwidth corresponding to the requested quality is "narrow", the allocation execution unit 48 will allocate a subcarrier block having a larger average value among the subcarrier blocks 200 selected as the allocation candidates, to the terminal apparatus 20, regardless of the statistical value derived by the derivation unit 44. If the delay tolerance corresponding to the requested quality is "high", the allocation execution unit 48 will allocate a subcarrier block having a larger statistical value among the subcarrier blocks 200 selected as the allocation candidates, to the terminal apparatus 20.

A description will now be given more specifically using examples. Here, the description is given as to which subcarrier block 200 of a plurality of subcarrier blocks which are the allocation candidates is to be allocated to a terminal apparatus 20 when communications involving such applications as shown in FIG. 6 are requested by the terminal apparatus 20. FIG. 6 shows a required quality example 400 for each application in the terminal apparatus of FIG. 1.

A required quality example 400 includes an application column 410, a continuous communication period column 420, a required frequency bandwidth column 430, and a real-timeliness column 440. Information contained in each column is transmitted from the terminal apparatus 20 as the requested quality.

The application column 410 indicates the names of applications requested by the terminal apparatus 20, which include "electronic mail", "TV telephone/conference", "voice call", "Web browsing", "file transfer", "stored images (video on demand)" and "streaming video". The applications are not limited to those listed here and other various applications may be applied.

The continuous communication period column 420 indicates a continuous communication period for each application shown in the application column 410. The continuous communication period column 420 indicates specific values of the continuous communication period together with a degree of the continuous communication period indicated in parenthesis as "long", "medium" and "short". Here, a boundary value t1 between "long" and "medium" is set to "600", whereas a boundary value t2 between "medium" and "short" is set to "30". For example, the continuous communication period of "voice call" is "180" which is less than t1 and greater than or equal to t2, and thus this period is "medium".

The continuous communication period of "streaming video" is "600" which is greater than or equal to t1 and therefore this period is "long". The other periods will be determined to be one of "long", "medium" and "short" in the similar manner. Note that the degree of the continuous communication period may be expressed by two levels which are "long" and "short".

The required frequency bandwidth column 430 indicates a required frequency bandwidth for each application shown in the application column 410. The required frequency bandwidth column 430 indicates specific values of the required frequency bandwidth together with a degree of the continuous communication period indicated in parenthesis as "broad", "medium" and "narrow". Here, a boundary value f1 between "broad" and "medium" is set to "0.3", whereas a boundary value f2 between "medium" and "narrow" is set to "0.01". Note that the degree of the required frequency bandwidth may be expressed by two levels which are "broad" and "narrow".

The real-timeliness column 440 indicates the real-timeliness of each application shown in the application column 410. High real-timeliness means that the delay tolerance is less than a threshold value concerning the delay tolerance (which is defined as a threshold value for use in delay tolerance). Low real-timeliness means that the delay tolerance is greater than or equal to the threshold value concerning the delay tolerance. For example, consider a case where the application indicated in the application column 410 is "electronic mail". No urgency is required for this application, and there will be almost no problem even if retransmission processing is performed and a delay is caused. Thus the real-timeliness for "electronic mail" is "low" and its delay tolerance is greater than or equal to the threshold value concerning the delay tolerance. On the other hand, when the application indicated in the application column 410 is "TV telephone/conference", almost no delay is permitted. Thus its real-timeliness is "high" and the delay tolerance is less than the threshold value concerning the delay tolerance.

Figure 7:
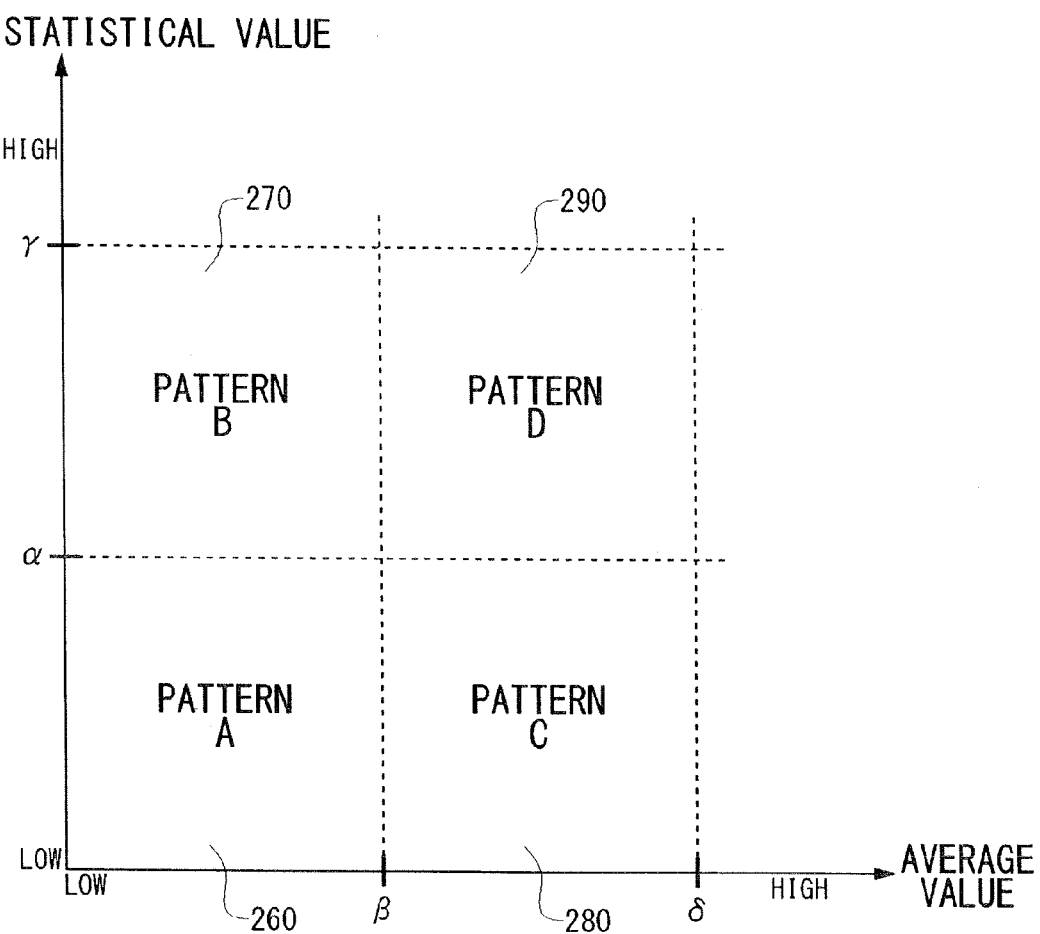
FIG. 7 illustrates an example of classifying a subcarrier block in a communication system shown in FIG. 1.

Under these circumstances, four examples will be given below as to how to select a subcarrier block 200 to be allocated. A description is given here of a case where, as shown in FIG. 7, each subcarrier block 200 is divided into four based on average values and statistical values and any of subcarrier blocks 200 is selected. FIG. 7 illustrates an example of classifying a subcarrier block 200 in the communication system 100 shown in FIG. 1. The vertical axis represents the magnitude of statistical values. $\alpha$ is a threshold value used for the classification in terms of the statistical values. The horizontal value represents the magnitude of average values. $\beta$ is a threshold value used for the classification in terms of the average values.

In this classification example, there are pattern A region 260, pattern B region 270, pattern C region 280 and a pattern D region 290. Here, $\gamma$ is the aforementioned first threshold value, and $\delta$ is the aforementioned second threshold value. The pattern A region 260 contains a subcarrier block 200 which has a statistical value smaller than the threshold value $\alpha$ for statistical values and has an average value smaller than the threshold value $\beta$ for average values. The pattern B region 270 contains a subcarrier block 200 which has a statistical value larger than or equal to $\alpha$ and smaller than $\gamma$ and has an average value smaller than $\beta$. The pattern C region 280 contains a subcarrier block 200 which has a statistical value smaller than $\alpha$ and has an average value larger than or equal to $\beta$ and smaller than $\delta$. The pattern D region 290 contains a subcarrier block 200 which has a statistical value larger than or equal to α and smaller than γ and has an average value larger than or equal to β and smaller than δ.

EXAMPLE (1)

If the application requested from the terminal apparatus 20 is such that the required frequency bandwidth is "broad" and the real-timeliness is "high" as in "TV telephone/conference", allocation can only be made to the subcarrier block 200 in the pattern A region 260. Almost no delay due to retransmission is permitted to the application of high real-timeliness such as "TV telephone/conference", so that a bandwidth of high quality needs to be used. Hence, even though there are other unused subcarrier blocks 200, the allocation execution unit 48 allocates only the subcarrier block 200 in the pattern A region 260 to the terminal apparatus 20.

EXAMPLE (2)

If the application requested from the terminal apparatus 20 is such that the required frequency bandwidth is "narrow" and the real-timeliness is "high" as in the case of "voice call", the allocation may be made to any subcarrier block 200 regardless of the magnitude of average values, as long as the subcarrier block 200 has a statistical value smaller than the threshold value α for statistical values. The reason for "as long as the subcarrier block 200 has a statistical value smaller than the threshold value α" is as follows. If smaller than α, that is, if the variation in interference power is small, there will be cases where the error can be corrected by a transmit power control, correction decoding or the like in the event that the average value of the interference power is large. Hence the delay due to the retransmission can be reduced. Accordingly, if there are a plurality of unused subcarrier blocks 200, the allocation will preferentially be made to a subcarrier block 200 containing the pattern C region 280 that has a statistical value smaller than α and an average value larger than or equal to β.

Applications like the above-described "TV telephone/conference" is allocated to a subcarrier block 200 of the pattern A region 260 only. Thus, there is a need to leave subcarrier blocks 200 of high quality unused on purpose. However, if there is no subcarrier block 200 of the pattern C region 280 and there is a subcarrier block 200 of the pattern A region 260, it will be inefficient to leave the subcarrier block 200 of high quality unused. Accordingly, in such a case, the allocation execution unit 48 allocates the subcarrier block 200 of the pattern A region 260 to the terminal apparatus 20. In this case, the occupancy time of the subcarrier block 200 can be reduced, so that the system resource utilization can be practically improved.

In this manner, if the real-timeliness is low and the required frequency bandwidth is narrow, the allocation execution unit 48 will preferentially allocate a subcarrier block 200, having a statistical value smaller than the threshold value α for statistical values and an average value larger than or equal to β for average values, to the terminal apparatus 20. Such an allocation scheme ensures the stability of communications and, at the same time, the resources can be efficiently allocated.

EXAMPLE (3)

In a case when the required frequency bandwidth in the application requested by the terminal apparatus 20 is "broad" and the real-timeliness is "low" as with "file transfer", allocation can be made regardless of the magnitude of statistical values. The reason for this is as follows. In the case when the required real-timeliness in the application is low, the increase in the number of retransmissions increases due to the variation in interference power causes no problem. Also, in this case, the allocation to a subcarrier block 200 having an average value smaller than the threshold value β for average values can reduce communication time, which is desirable in consideration of system resource utilization efficiency.

Thus, if the required frequency bandwidth is "broad" and the real-timeliness is "low", allocation will be preferentially made to a subcarrier block 200 of the pattern B region 270 having a statistical value larger than or equal to α and an average value smaller than β. If there is no subcarrier block 200 of the pattern B region 270 and there is a subcarrier block 200 of the pattern A region 260 or the pattern C region 280 separately or both the regions together, the allocation execution unit 48 will allocate the pattern C region 280 and the pattern A region 260 in this order of preference, to the terminal apparatus 20.

Here, if neither subcarrier block 200 of the pattern A region 260, the pattern B region 270 and the pattern C region 280 exists and a subcarrier block 200 of the pattern D region 290 only exists, the allocation execution unit 48 will allocate the pattern D region 290 to the terminal apparatus 20. In such a case, when the real-timeliness is "low", it is often the case that no problem arises even though the quality is inferior and therefore retransmission is frequently required. Even with the subcarrier block 200 of inferior quality such as the pattern D area 290, it will be inefficient to leave such a subcarrier block 200 of inferior quality unused. Accordingly, in such a case as this, the allocation execution unit 48 allocates the subcarrier block 200 of the pattern D area 290 to the terminal apparatus 20.

EXAMPLE (4)

In a case when the required frequency bandwidth in the application requested by the terminal apparatus 20 is "narrow" and the real-timeliness is "low" as with "Web browsing", allocation can be made to any subcarrier block 200 regardless of both the statistical values and the average values. Accordingly, if there are a plurality of unused subcarrier blocks 200, allocation will be preferentially made to the subcarrier block 200 of the pattern D region 290.

If there is no subcarrier block 200 of the pattern D region 290 and there is a subcarrier block 200 of the pattern A region 260, the pattern B region 270 or the pattern C region 280 separately or there exist subcarrier blocks 200 of two or more patterns together, the allocation execution unit 48 will allocate the pattern B region 270, the pattern C region 280 and the pattern A region 260 in this order of preference, to the terminal apparatus 20.

In this manner, in the case when the real-timeliness is low and the required frequency bandwidth is narrow, the subcarrier block 200 of the pattern D region 290 is preferentially allocated to the terminal apparatus 20. Thereby, the stability of communication is ensured and at the same time the resource can be efficiently allocated.

The allocation of the subcarrier blocks 200 may be determined using the degree of the continuous communication period indicated in the continuous communication period column 420. For example, in a case when an application whose degree of the continuous communication period is "long" is requested, a subcarrier block 200 having a satisfactory quality such as the pattern A region 200 may be allocated to shorten the resource occupancy period. On the other hand, in the case when the degree of the continuous communication period is "short", it is speculated that the resource occupancy period will not be much long even if a certain degree of error occurs. Accordingly, it is desirable that subcarrier blocks 200 having a satisfactory quality be left unused on purpose for the aforementioned application whose degree of the communication period is "long". Thus, if an application whose degree of the continuous communication period is "short" is required, the subcarrier block 200 having an inferior quality may be allocated preferentially in the order, starting from an inferior quality, of the pattern D region 290, the pattern C region 280 and the pattern B region 270, for example. The present embodiment ensures the stability of communications and, at the same time, the resources can be efficiently allocated.

Refer back to FIG. 5. If no subcarrier block 200 is selected as the allocation candidate, the allocation execution unit 48 checks if there is any unused subcarrier block which has not been allocated to any terminal apparatus 20. If there is an unused subcarrier block, the allocation execution unit 48 will compare an average value on the unused subcarrier block with a required average value of another terminal apparatus 20 to which any subcarrier block 200 is allocated. The allocation execution unit 48 compares a statistical value on the unused subcarrier block with a required statistical values of another terminal apparatus 20 to which any subcarrier block 200 is allocated. If the average value and the statistical value of the unused subcarrier block are both smaller than the required average value and the required statistical value of another terminal apparatus, the subcarrier block 20 allocated to another terminal apparatus is switched to the unused subcarrier block. The allocation execution unit 48 allocates the subcarrier block 200, which has been allocated to another terminal apparatus 20, to a terminal apparatus 20 to be allocated.

If there is no unused subcarrier block or if the average value and the statistical value of the unused subcarrier block are not both smaller than the required average and the required statistical value of another terminal apparatus, the allocation execution unit 48 transmits a signal indicating that the allocation is not permitted.

A description is now given using an example. In this example, a description is given of a case where four subcarriers 200 are allocated to four terminal apparatuses 200. FIG. 8 shows an example of quality of a subcarrier block 200 according to an embodiment of the present invention. As shown in FIG. 8, assume herein that after average values and statistical values in a first subcarrier block 200a to a fourth subcarrier block 200d are derived by the channel allocation unit 40, they are indicated in an average value column 380 and a statistical value column 390, respectively. Assume also that all the average values are smaller than a first threshold value and all the statistical value are smaller than a second threshold value. That is, the average value "C'" indicates that the quality is inferior to the average value "B'" or "A'" but is smaller than the first threshold value. Assume also that "A'", "B'" and "C'" are smaller than "A", "B" and "C" indicated in the required average value column 350 of FIG. 4, respectively. Similarly, the statistical value "Y'" indicates that the quality is inferior to the statistical value "X'" but is smaller than the second threshold value. Assume also that "X'" and "Y'" are smaller than "X" and "Y" indicated in the required statistical value column 360 of FIG. 4, respectively.

Here, a description will be given assuming that the first terminal apparatus 20a makes an allocation request first and then the second terminal apparatus 20b to the fourth terminal apparatus 20d make allocation requests in sequence. Assume that the quality requested by the first terminal apparatus 20a is level 4. Assume also that the qualities requested by the second terminal apparatus 20b to the fourth terminal apparatus 20d are levels 3, 2 and 1, respectively. For convenience of explanation, assume that the average value and the statistical value of each subcarrier block 200 remains unchanged during a period from the time when the first terminal apparatus 20a to the fourth terminal apparatus 20d make allocation requests and until the time when allocation processing comes to an end. Assume also that the first terminal apparatus 20a continues to perform communications until the allocation of the fourth terminal apparatus 20d is completed.

A description is first given of a case where an allocation request signal sent from the first terminal apparatus 20a is received. Since the quality requested by the first terminal apparatus 20a is level 4, the required average value is "A" and the required statistical value is "Y" according to the requested quality table 300 stored in the memory 50. Accordingly, the channel allocation unit 40 can allocate the first subcarrier block 200a having an average value smaller than or equal to "A" and a statistical value smaller than or equal to "Y" or any subcarrier block 200 corresponding to levels 1 to 3 characterized by the requested quality higher than level 4, to the terminal apparatus 20a. As shown in FIG. 8, there are a first subcarrier block 200a to a fourth subcarrier block 200d as subcarrier blocks that satisfy this condition and are not allocated to any terminal apparatus 20.

Here, the subcarrier block 200 of the highest quality is the third subcarrier block 200c of level 1. However, any statistical value is acceptable for the first terminal apparatus 20a that requests the quality of level 4 as long as the average value is smaller than or equal to "A". Thus the channel allocation unit 40 allocates the first subcarrier block 200a having a larger statistical value, to the first terminal apparatus 20a. This allocation scheme makes it possible to preserve subcarrier blocks 200 having smaller statistical values and higher quality for later use with terminal apparatuses 20 requesting higher quality.

A description is next given of a case where an allocation request signal from the second terminal apparatus 20b is received. Since the quality requested by the second terminal apparatus 20b is level 3, the required average value is "C" or below and the required statistical value is "X" or below according to the requested quality table 300 stored in the memory 50. Accordingly, the channel allocation unit 40 can allocate a subcarrier block 200 having an average value smaller than or equal to "C" and a statistical value smaller than or equal to "X" or any subcarrier block 200 corresponding to levels 1 and 2 characterized by the requested quality higher than level 3, to the terminal apparatus 20a. As shown in FIG. 8, there are a second subcarrier block 200b, a third subcarrier block 200c and a fourth subcarrier block 200d as subcarrier blocks that satisfy this condition and are not allocated to any terminal apparatus 20.

Here, the subcarrier block 200 of the highest quality is the third subcarrier block 200c of level 1. However, any average value is acceptable for the second terminal apparatus 20b that requests the quality of level 3 as long as the statistical value is smaller than or equal to "X". Thus the channel allocation unit 40 allocates the second subcarrier block 200b having a larger statistical value, to the second terminal apparatus 20a. This allocation scheme makes it possible to preserve subcarrier blocks 200 having smaller average values and higher quality for later use with terminal apparatuses 20 requesting high quality.

A description is next given of a case where an allocation request signal from the third terminal apparatus 20c is received. Since the quality requested by the third terminal apparatus 20c is level 2, the required average value is "B" or below and the required statistical value is "X" or below according to the requested quality table 300 stored in the memory 50. Accordingly, the channel allocation unit 40 can allocate a subcarrier block 200 having an average value smaller than or equal to "B" and a statistical value smaller than or equal to "X" or any subcarrier block 200 corresponding to level 1, to the terminal apparatus 20a. As shown in FIG. 8, there are a third subcarrier block 200c and a fourth subcarrier block 200d as subcarrier blocks that satisfy this condition and are not allocated to any terminal apparatus 20.

Here, the subcarrier block 200 of the highest quality is the third subcarrier block 200c. In the case of the third terminal apparatus 20c, the required average value is "B" or below and therefore, similar to the case of the second terminal apparatus 20b, in theory, the fourth subcarrier block 200d having a worse average value in the range that satisfies the required average value "B" can be allocated to the third terminal apparatus 20c. However, different from the case of the second terminal apparatus 20b, the third terminal apparatus 20c will have the required average value "B" not "C". Preserving the third subcarrier block 200c of high quality even in such a case as this inhibits the optimum resource allocation. Thus, the base station apparatus 10 allocates the third subcarrier block 200c to the third terminal apparatus 20c. This allocation scheme can enhance the throughput. In the present embodiment, subcarrier blocks 200 having high quality are preserved only if the required average value is "C". With this "exception processing", a balance is achieved between the effective utilization of system resources and the enhancement of throughput.

A description is finally given of a case where an allocation request signal from the fourth terminal apparatus 20d is received. As shown in FIG. 8, there are two subcarrier blocks 200, namely the first subcarrier block 200a and the third subcarrier block 200c, that satisfy level 1. However, both subcarrier blocks 200 have already been allocated to other terminal apparatuses 20. Accordingly, the channel allocation unit 40 determines whether or not the first subcarrier block 200a or the third subcarrier block 200c allocated to the first terminal apparatus 20a or the third terminal apparatus 20c can be switched to the fourth subcarrier block 200d to which no terminal apparatus 20 has been allocated.

Here, the quality requested by the third terminal apparatus 20c is level 2 and, as shown in FIG. 8, the average value "B'" and the statistical value "X'" in the fourth subcarrier block 200d satisfy the level 2. Thus, the channel allocation unit 40 switches the subcarrier block 200 allocated to the third terminal apparatus 20c from the third subcarrier block 200c to the fourth subcarrier block 200d. Further, the channel allocation unit 40 allocates the third subcarrier block 200c to the fourth terminal apparatus 20d.

In the above-described cases, since the required average value of the third terminal apparatus 20c is "B" or below, the allocation is made to the third subcarrier block 200c of higher quality without resorting to "exception processing". As a result, it may be said that the switching processing had to be carried out in the allocation processing of the fourth terminal apparatus 20d. However, since the level of quality requested by a terminal apparatus 20 that next makes an allocation request cannot be predicted, the above-described processing cannot be said to be a wasteful processing. For example, if the quality requested by the fourth terminal apparatus 20d which is allocated last is level 2 or below, the channel allocation unit 40 can allocate the fourth subcarrier block 200d to the fourth terminal apparatus 20d without performing the switching processing. Further, for the third terminal apparatus 20c to which the subcarrier block 200 of higher quality is allocated, the number of retransmissions is reduced. Thus, the throughput is enhanced and the third subcarrier block 200c can be relieved early. Hence, the adoption of the above-described "exception processing" is indispensable for the achievement of the balance between the effective utilization of system resources and the enhancement of throughput.

As described above, in the case where three subcarrier blocks 200 out of four subcarrier blocks 200 are allocated to the terminal apparatuses 20, the effective utilization of system resources can be achieved by switching the subcarrier blocks to be allocated thereto.

In terms of hardware, this structure described as above can be realized by a CPU, a memory and other LSIs of an arbitrary computer. In terms of software, it can be realized by memory-loaded programs which have communication functions and the like, but drawn and described herein are function blocks that are realized in cooperation with those. Hence, it is understood by those skilled in the art that these function blocks can be realized in a variety of forms such as by hardware only, software only or the combination thereof.

Figure 9:
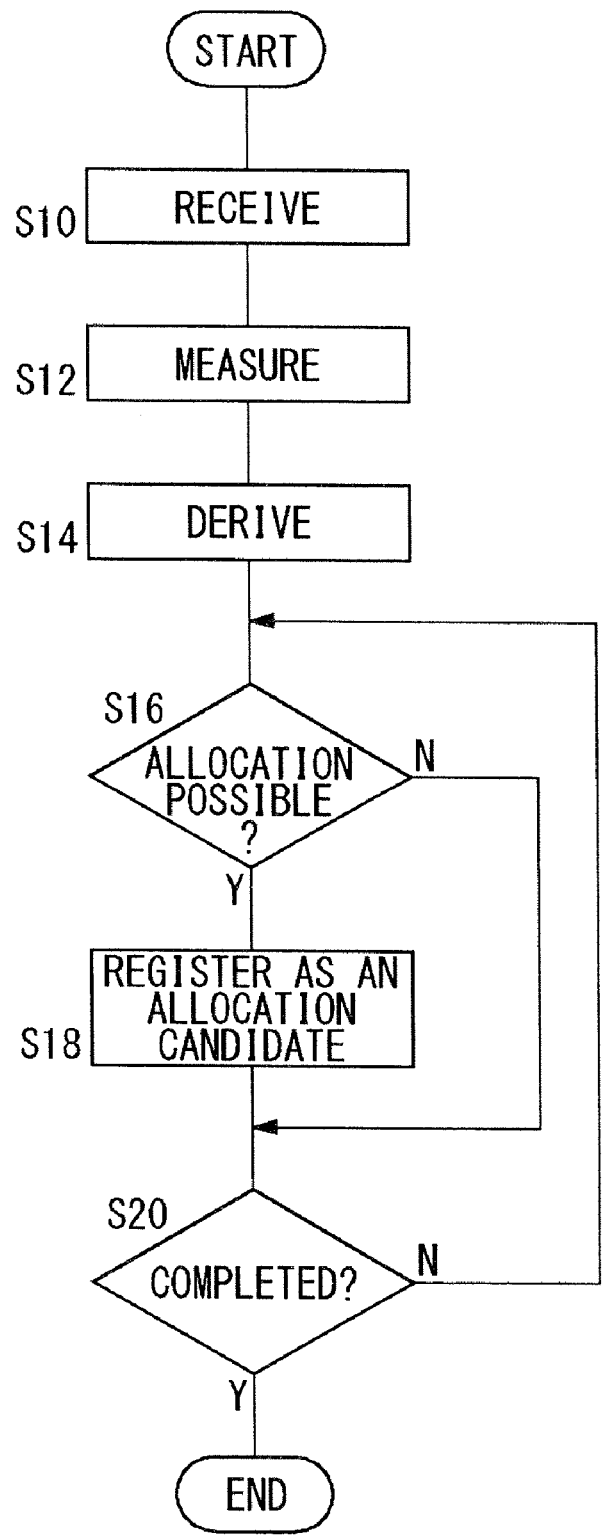
FIG. 9 is a flowchart showing an exemplary operation of a base station apparatus of FIG. 3.

An operation of the base station apparatus 10 structured as above is now described. FIG. 9 is a flowchart showing an exemplary operation of the base station apparatus 10 shown in FIG. 3. The operation shown in the flowchart of FIG. 9 may be performed upon receipt of an allocation signal from any of the terminal apparatuses 20.

First, the receiver 30 receives an allocation request signal from a terminal apparatus 20 (S10). Then, of a plurality of subcarriers contained in each subcarrier block 200, the channel allocation unit 40 measures the interference power of at least part of subcarriers (S12). From the interference power measured, the channel allocation unit 40 derives an average value and a statistical value of the interference power for each subcarrier block 200 (S14). Then the channel allocation unit 40 determines whether or not a subcarrier block can be allocated to the terminal apparatus 20 that has transmitted the allocation request signal (S16). The decision processing is performed as follows. The memory 50 is accessed so as to select a required average value and a required statistical value that satisfy the requested quality contained in the allocation request signal The average value and a required average value are compared for each subcarrier block 200. Further, the statistical value and a required statistical value are compared with each other. It is checked if the subcarrier block 200 has not been allocated to any terminal apparatus 20. More specifically, among the subcarrier blocks 200 where the average value is larger than the statistical value and the subcarrier blocks 200 where the statistical value is larger than the average value, the channel allocation unit 40 determines that allocation is possible if no subcarrier block has been allocated to any terminal apparatus 20 and determines otherwise if not.

When it is determined that the allocation is possible (Y of S16), the channel allocation unit 40 registers the subcarrier block 200 as an allocation candidate (S18). If, on the other hand, it is determined that the allocation is not possible (N of S16), Step proceeds to the processing of S20. In the processing of S20, it is determined whether the decision processing of S16 on all the subcarrier blocks 200 has been completed or not. If the decision processing of S16 on all the subcarrier blocks 200 has been completed (Y of S20), the processing will be terminated. If the decision processing has not been completed (N of S20), the decision processing of S16 will be performed on subcarrier blocks 200 where the decision processing has not been completed yet.

Figure 10:
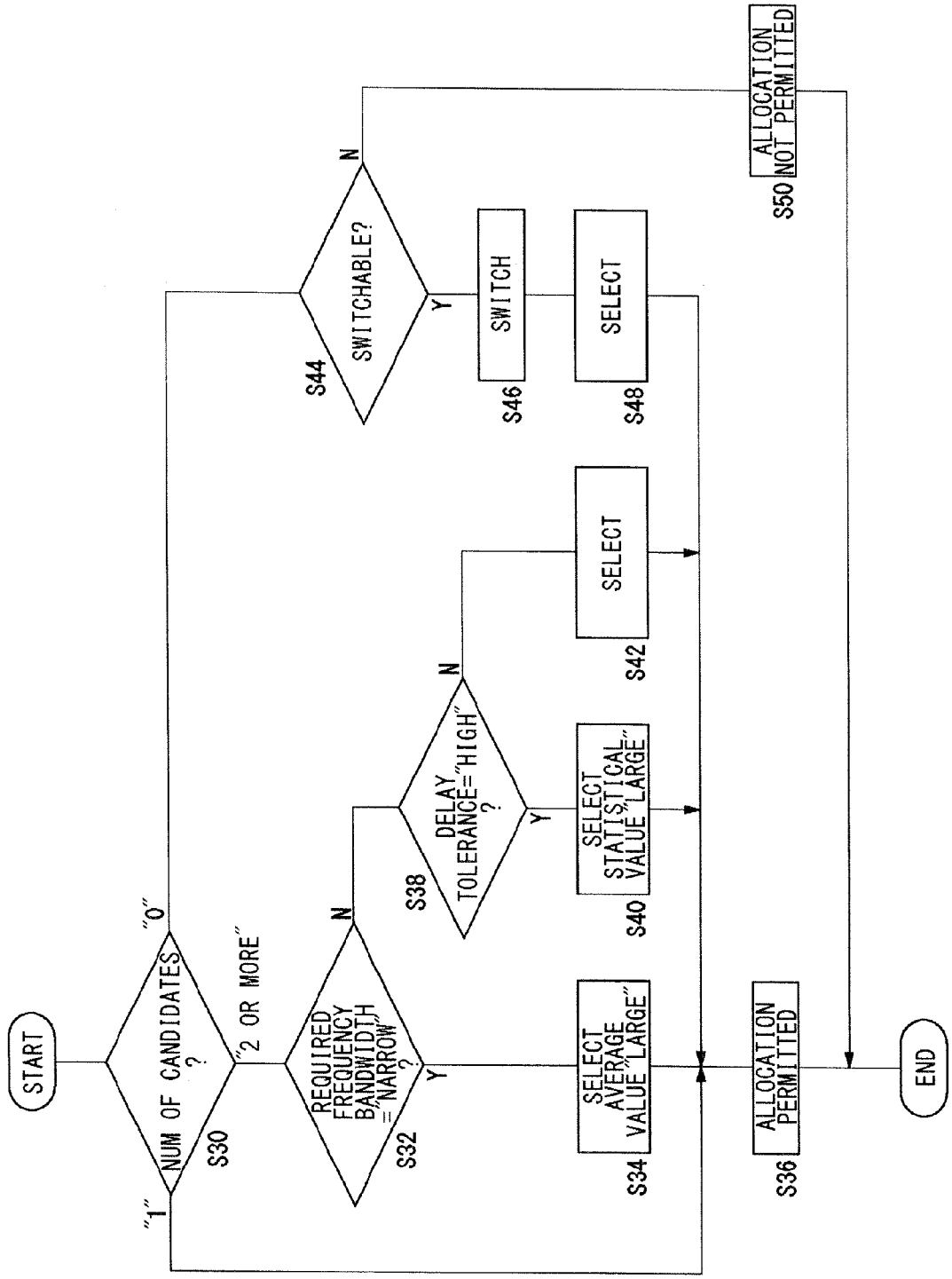
FIG. 10 is a flowchart showing an exemplary operation of a base station apparatus of FIG. 5.

FIG. 10 is a flowchart showing an exemplary operation of the channel allocation unit 40 shown in FIG. 5. The operation shown in the flowchart of FIG. 10 may be performed upon completion of the processing shown in FIG. 9.

The channel allocation unit 40 switches the processing in accordance with the number of candidates registered (S30). If the number of candidates is 1 ("1" of S30), the subcarrier block 200 being the candidate will be allocated to the terminal apparatus 20 (S36). If the number of candidates is 2 or more ("2 or more" of S30), the channel allocation unit 40 will access the memory 50 so as to check the required frequency bandwidth corresponding to the requested quality contained in the allocation request signal (S32). Here, if the required frequency bandwidth is "narrow" (Y of S32), the channel allocation unit 40 will select a subcarrier block 200 having a larger average value among the subcarrier blocks 200 being the allocation candidates, for the terminal apparatus 20 (S34). Further, the channel allocation unit 40 will allocate the thus selected subcarrier block 200 to the terminal apparatus 20 (S36).

If the required frequency bandwidth is not "narrow" (N of S32), the channel allocation unit 40 will access the memory 50 so as to check the delay tolerance corresponding to the requested quality contained in the allocation request signal (S38). Here, if the delay tolerance is "high" (Y of S38), the channel allocation unit 40 will select a subcarrier block 200 having a larger statistical value among the subcarrier blocks 200 being the allocation candidates, for the terminal apparatus 20 (S40). Further, the channel allocation unit 40 will allocate the thus selected subcarrier block 200 to the terminal apparatus 20 (S36). If, on the other hand, the delay tolerance is not "high" (N of S38), the channel allocation unit 40 will select a subcarrier block 200 having the highest level of quality among the subcarrier blocks 200 being the allocation candidates (S42) and allocate the thus selected subcarrier block 200 to the terminal apparatus 20 (S36).

If the number of allocation candidates is 0 ("0" of S30), the channel allocation unit 40 will perform the following processing to determine whether the switching is possible or not (S44). In Step S44, the channel allocation unit 40 first checks if there is any unused subcarrier block which has been allocated to any terminal apparatus 20. If there is any unused subcarrier block, the allocation execution unit 48 will compare the average value on an unused subcarrier block with required averages value of other terminal apparatuses 20 to which any subcarrier blocks 200 have been allocated. Also, the allocation execution unit 48 compares the statistical value on the unused subcarrier block with required statistical values of other terminal apparatuses 20 to which any subcarrier blocks 200 have been allocated. Here, if the average value and the statistical value of the unused subcarrier block are both smaller than the required average values and the required statistical values of other terminal apparatuses, it will be determined that the subcarrier block 200 allocated to the other terminal apparatus can be switched to the unused subcarrier block. If otherwise, it will be determined that the switching is not possible.

If it is determined that the switching is possible (Y of S44), the channel allocation unit 40 will switch the subcarrier block 200 allocated to the other terminal apparatus, to the unused subcarrier block (S46). Also, the channel allocation unit 40 selects the subcarrier block 200 which has been allocated to the other terminal apparatus, as the subcarrier block 200 to be allocated to the terminal apparatus 20 that transmitted the allocation request signal (S48), and allocates the thus selected subcarrier block 200 to the terminal apparatus 20 (S36). If it is determined that the switching is not possible (N of S44), the channel allocation unit 40 will transmit to the terminal apparatus 20 a signal indicating that the allocation is not permitted (S50).

According to the embodiments of the present invention, at least one subcarrier block 200 is allocated to the terminal apparatus 20, based on the average value and the statistical value. As a result, the allocation in accordance with the communication quality is achieved and the throughput can be enhanced. The allocation is made such that the subcarrier block 200 having a smaller statistical value is used, so that the communications with a smaller number of retransmissions can be realized and the throughput can be improved. By employing this structure, the subcarrier block which has been allocated and occupied is relieved and made available earlier, so that the system resource can be effectively utilized.

Also, if the average value and the statistical value of the unused subcarrier block which has not been allocated to any terminal apparatus 20 are both smaller than the required average values and the required statistical values of the other terminal apparatuses 20, the subcarrier block 200 allocated to the other terminal apparatus will be switched to the unused subcarrier block, and the subcarrier block 200 which has been allocated to the other terminal apparatus will be allocated to a terminal apparatus to be newly allocated. Thereby, the number of terminal apparatuses to which no subcarrier blocks have been allocated can be reduced and therefore the system resources can be optimally allocated and utilized.

Also, if the required frequency bandwidth contained in the requested quality is narrower than a predetermined width, the communications can be performed even though the average value is large and the communication quality is inferior. Thus, among the subcarrier blocks whose average values are smaller than a predetermined threshold value, subcarrier blocks are allocated to the terminal apparatus in the order starting from one whose average value is larger thereamong. As a result, the subcarrier blocks for terminal apparatuses requiring the communications of which the required frequency bandwidth is broader can be preserved and therefore the system resources can be optimally allocated.

The present invention has been described based on the exemplary embodiments. These are merely exemplary, and it is understood by those skilled in the art that various modifications to the combination of each component and each process thereof are possible and that such modifications are also within the scope of the present invention.

In the embodiments according to the present invention a description has been given in a manner that the average value and the statistical value of the interference power are derived using the interference power in a plurality of subcarriers contained in the subcarrier block 200. However, this should not be considered as limiting and, for example, the average value and the statistical value of the interference power, per unit time, in a subcarrier contained in the subcarrier block 200 may be derived instead. In the embodiments according to the present invention a description has been given in a manner that the communication system 100 uses OFDMA but FDMA may be used instead.

While the preferred embodiments of the present invention have been described using specific terms, such description is for illustrative purposes only, and it is to be understood that changes and variations may be made without departing from the spirit or scope of the appended claims.

What is claimed is:

1. A base station apparatus for allocating at least one subcarrier block, in a frequency band containing a plurality of subcarrier blocks each composed of a plurality of subcarriers, to a terminal apparatus, the base station apparatus comprising:
- a measurement unit which measures an interference power of at least part of subcarriers among a plurality of subcarriers in each of the plurality of subcarrier blocks;
- a derivation unit which derives, from the interference power of subcarriers measured by said measurement unit, an average value of the interference power for each of the plurality of subcarrier blocks and a variance of the interference power indicating a degree of variation in the interference power relative to the average value; and
- an allocation unit which allocates at least one subcarrier block to the terminal apparatus, based on the average value of the interference power and the variance of the interference power derived by said derivation unit.

2. A base station apparatus according to claim 1, wherein when the average value of the interference power derived by said derivation unit is less than a predetermined threshold value, said allocation unit allocates terminal apparatuses in the order starting from a subcarrier block having a smaller variance of the interference power derived by said derivation unit.

3. A base station apparatus according to claim 1, further comprising a receiver which receives, from a terminal apparatus, a signal containing an allocation request of the subcarrier block and a request quality required of the terminal,
wherein when the signal containing the allocation request is received anew by said receiver and a subcarrerier block that satisfies the request quality contained in the signal received by said receiver has already been allocated to another terminal apparatus, said allocation unit switches allocation of the subcarrier blocks according to a request quality required of the another terminal and a request quality required of a terminal apparatus to be allocated anew.

4. A base station apparatus according to claim 3, said allocation unit including:
- a storage which stores a relation between a required average value of the interference power and a required variance of the interference power for the request quality;
- a selector which selects a required average value of the interference power and a required variance of the interference power corresponding respectively to a request quality required of the another terminal apparatus and a request quality required of the terminal apparatus to be allocated anew, by referring to the relation stored in the storage when the subcarrerier block that satisfies the request quality contained in the signal received by said receiver has already been allocated to the another terminal apparatus; and
- an allocation execution unit which switches the subcarrier block allocated to the another terminal apparatus to an unused subcarrier block and allocates the subcarrier block allocated to the another terminal apparatus, to the terminal apparatus to be allocated anew, when an average value of the interference power and a variance of the interference power of the unused subcarrier block which has not been allocated to any terminal apparatuses are both less than a required average value of the interference power and a required variance of the interference power of the another terminal apparatus.

5. A base station apparatus according to claim 3, wherein the request quality contained in the signal received by said receiver includes a required frequency bandwidth necessary for performing communications,
wherein when the required frequency bandwidth included in the request quality is narrower than a predetermined bandwidth, said allocation unit allocates to a terminal apparatus a subcarrier block in the order starting from the subcarrier block having a large average value of the interference power in subcarrier blocks whose average values are less than the predetermined threshold value, independently of the variance of the interference power derived by said derivation unit.

6. A base station apparatus according to claim 3, wherein the request quality contained in the signal received by said receiver includes a delay tolerance indicating a degree to which a delay in a communication is allowed,
wherein when the delay tolerance included in the request quality is greater than a predetermined tolerance, said allocation unit allocates to a terminal apparatus in the order starting from a subcarrier block having a large variance of the interference power in subcarrier blocks whose variances of the interference power are less than a threshold value for the variances of the interference power.

7. An allocation method, comprising:
- deriving an average value of an interference power for a subcarrier block composed of a plurality of subcarriers and a variance of the interference power indicating a degree of variation in the interference power relative to the average value, and
- allocating at least one subcarrier block to a terminal apparatus, based on the derived average value of the interference power and the derived variance of the interference power.

8. A program stored in a non-transitory computer readable medium and executed by a computer, the program including the functions of:
- deriving an average value of an interference power for a subcarrier block composed of a plurality of subcarriers and a variance of the interference power indicating a degree of variation in the interference power relative to the average value; and
- allocating at least one subcarrier block to a terminal apparatus, based on the derived average value of the interference power and the derived variance of the interference power.

9. A base station apparatus, comprising:
- an acquisition unit which acquires a delay tolerance, indicating a degree to which a delay in a communication is allowed, and required bandwidth information, indicating a bandwidth required for a communication, when the communication is performed with a terminal apparatus by allocating at least one subcarrier block, in a frequency band containing a plurality of subcarrier blocks each composed of a plurality of subcarriers, to the terminal apparatus;
- a measurement unit which measures an interference power of at least part of subcarriers among a plurality of subcarriers in each of the plurality of subcarrier blocks;
- a derivation unit which derives, from the interference power of subcarriers measured by said measurement unit, an average value of the interference power for each of the plurality of subcarrier blocks and a variance of the interference power indicating a degree of variation in the interference power relative to the average value; and
- an allocation unit which allocates at least one subcarrier block to the terminal apparatus, based on the average value of the interference power and the variance of the interference power derived by said derivation unit and the delay tolerance and the required bandwidth information acquired by said acquisition unit.

10. A base station apparatus according to claim 9, wherein a threshold value for the delay tolerance is defined as a threshold value for use in delay tolerance,
   a threshold value for the bandwidth is defined as a threshold value for use in bandwidth,
   a threshold value for the variance of the interference power is defined as a variance threshold value,
   a threshold value for the average value of the interference power is defined as a threshold value for use in average values, and
   when the delay tolerance is less than the delay threshold value and the required bandwidth information is greater than or equal to the bandwidth threshold value, a subcarrier block having an average value of the interference power less than the average threshold value and a variance of the interference power less than the variance threshold value is preferentially allocated to the terminal apparatus.

11. A base station apparatus according to claim 9, wherein a threshold value for the delay tolerance is defined as a threshold value for use in delay tolerance,
   a threshold value for the bandwidth is defined as a threshold value for use in bandwidth,
   a threshold value for the variance of the interference power is defined as a variance threshold value,
   a threshold value for the average value of the interference power is defined as a threshold value for use in average values, and
   when the delay tolerance is less than the delay threshold value and the required bandwidth information is less than the bandwidth threshold value, a subcarrier block having an average value of the interference power greater than or equal to the average threshold value and a variance of the interference power less than the variance threshold value is preferentially allocated to the terminal apparatus.

12. A base station apparatus according to claim 9, wherein a threshold value for the delay tolerance is defined as a threshold value for use in delay tolerance,
   a threshold value for the bandwidth is defined as a threshold value for use in bandwidth,
   a threshold value for the variance of the interference power is defined as a variance threshold value
   a threshold value for the average value of the interference power is defined as a threshold value for use in average values, and
   when the delay tolerance is greater than or equal to the delay threshold value and the required bandwidth information is greater than or equal to the bandwidth threshold value, a subcarrier block having an average value of the interference power less than the average threshold value and a variance of the interference power greater than or equal to the variance threshold value is preferentially allocated to the terminal apparatus.

13. A base station apparatus according to claim 9, wherein a threshold value for the delay tolerance is defined as a threshold value for use in delay tolerance,
   a threshold value for the bandwidth is defined as a threshold value for use in bandwidth,
   a threshold value for the variance of the interference power is defined as a variance threshold value,
   a threshold value for the average value of the interference power is defined as a threshold value for use in average values, and
   when the delay tolerance is greater than or equal to the delay threshold value and the required bandwidth information is less than the bandwidth threshold value, a subcarrier block having an average value of the interference power greater than or equal to the average threshold value and a variance of the interference power greater than or equal to the variance threshold value is preferentially allocated to the terminal apparatus.

* * * * *